United States Patent
Abe et al.

(10) Patent No.: US 7,874,541 B2
(45) Date of Patent: Jan. 25, 2011

(54) PROPORTIONAL SOLENOID AND FLOW CONTROL VALVE EMPLOYING THEREOF

(75) Inventors: Makoto Abe, Fujisawa (JP); Yasushi Yamamoto, Fujisawa (JP); Hiroyuki Kawanishi, Fujisawa (JP); Tomohisa Sako, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 597 days.

(21) Appl. No.: 11/815,604

(22) PCT Filed: Dec. 15, 2005

(86) PCT No.: PCT/JP2005/023045

§ 371 (c)(1),
(2), (4) Date: Aug. 6, 2007

(87) PCT Pub. No.: WO2006/085420

PCT Pub. Date: Aug. 17, 2006

(65) Prior Publication Data
US 2009/0008586 A1    Jan. 8, 2009

(30) Foreign Application Priority Data
Feb. 9, 2005 (JP) .............................. 2005-032937

(51) Int. Cl.
*F16K 31/02* (2006.01)
(52) U.S. Cl. ............................ 251/129.15; 137/625.69; 335/279; 335/297
(58) Field of Classification Search ............ 251/129.15; 137/625.25, 625.69; 335/279, 296, 297
See application file for complete search history.

(56) References Cited

U.S. PATENT DOCUMENTS

| | | | | |
|---|---|---|---|---|
| 3,168,242 A | * | 2/1965 | Diener | ........................ 236/75 |
| 4,539,542 A | | 9/1985 | Clark | |
| 4,604,600 A | | 8/1986 | Clark | |
| 5,066,980 A | * | 11/1991 | Schweizer | .................. 335/255 |
| 5,123,718 A | * | 6/1992 | Tyler | ........................ 303/118.1 |
| 6,601,822 B2 | * | 8/2003 | Tachibana et al. | ...... 251/129.15 |

FOREIGN PATENT DOCUMENTS

| | | |
|---|---|---|
| JP | S60-73207 | 5/1985 |
| JP | 61-287108 | 12/1986 |
| JP | S62-138416 | 9/1987 |
| JP | H01-97507 | 6/1989 |

* cited by examiner

*Primary Examiner*—John K Fristoe, Jr.
(74) *Attorney, Agent, or Firm*—McCormick, Paulding & Huber LLP

(57) ABSTRACT

A proportional solenoid 5 comprising: an electromagnetic coil 9; a fixed yoke 10 provided immovably inside the electromagnetic coil 9 and having a convex portion 13 formed at an edge portion of an end surface of the fixed yoke; and a movable yoke 20 that is disposed inside the electromagnetic coil 9, has a tip portion thereof inserted into the convex portion 13 of the fixed yoke 10, and is provided movably relative to the fixed yoke 10, the proportional solenoid 5 enabling the position adjustment of the movable yoke 20 by controlling an electric current applied to the electromagnetic coil 9, wherein a protruding portion 21 that protrudes at the side of the fixed yoke 10 is formed at an edge portion of the surface of the movable yoke 20 on the side of the fixed yoke 10, and an inner surface 21*b* of this protruding portion 21 is tapered such that the inner surface is located further outside as the inner surface approaches the fixed yoke 10.

5 Claims, 5 Drawing Sheets

PROPORTIONAL SOLENOID AND FLOW CONTROL VALVE EMPLOYING THEREOF

CROSS REFERENCE TO RELATED APPLICATIONS

This application is entitled to the benefit of and incorporates by reference essential subject matter disclosed in International Patent Application No. PCT/JP2005/023045 filed on Dec. 15, 2005 and Japanese Patent Application No. 2005-032937 filed Feb. 9, 2005.

TECHNICAL FIELD

The present invention relates to a proportional solenoid and a flow control valve employing thereof, and more particularly to thrust force improvement of a proportional solenoid.

BACKGROUND ART

A proportional solenoid is a device that can freely adjust the position of a movable yoke (plunger) by controlling electric current applied to an electromagnetic coil, and proportional solenoids have been used as valve drive means and the like for flow control valves, pressure control valves, direction switching valves and the like (see Japanese Patent Application Publication No. 2004-218816 and Japanese Patent Application Publication No. H9-69432).

The structure of a flow control valve using a proportional solenoid will be described below with reference to FIG. 6.

A flow control valve 100 adjusts an opening area of a port 6 by moving a spool 3 of a spool valve 2 with a proportional solenoid 50 (valve drive means) and controls the flow rate of fluid flowing through the port 6.

The proportional solenoid 50 comprises an annular bobbin 7 and an electromagnetic coil 9 wound on the outer periphery of the bobbin 7, and a fixed yoke 10, a fixed guide 11, and a movable yoke 12 are disposed inside these electromagnetic coil 9 and bobbin 7.

The fixed yoke 10 is composed of a magnetic material and comprises a cylindrical insertion portion 10a that has an outer diameter somewhat less than the inner diameter of the bobbin 7 and a disk-shaped flange portion 10b formed at one end (right side end portion in the figure) of the insertion portion 10a and having an outer diameter almost equal to the outer diameter of the electromagnetic coil 9. The fixed yoke 10 is disposed by inserting the insertion portion 10a into the electromagnetic coil 9 and bobbin 7 and abutting the flange portion 10b against one side of the bobbin 7. The fixed yoke 10 is fixed and cannot be moved relative to the electromagnetic coil 9 and bobbin 7.

An annular convex portion 13 that protrudes in the axial direction is formed at the edge portion of a tip surface (left side end surface in the figure) of the insertion portion 10a of the fixed yoke 10, and the outer circumferential surface of the convex portion 13 is tapered at a predetermined angle such that a the outer circumferential surface inclines inwardly in the radial direction as the tip thereof is approached (side of the movable yoke 12).

The movable yoke 12 (plunger) is composed of a magnetic material and formed as a cylinder with an outer diameter somewhat less than the inner diameter of the convex portion 13 of the fixed yoke 10. The movable yoke 12 is disposed opposite to the fixed yoke 10 inside the electromagnetic coil 9 and bobbin 7, and the tip portion (right side end portion in the figure) of the movable yoke is inserted into the convex portion 13 of the fixed yoke 10. The movable yoke 12 is provided to be movable relative to the electromagnetic coil 9, bobbin 7, and fixed yoke 10 and can move in the axial direction (left-right direction in the figure) along the inner surface of the convex portion 13 of the fixed yoke 10.

The fixed guide 11 is also composed of a magnetic material and comprises a cylindrical insertion portion 11a having an outer diameter somewhat less than the inner diameter of the bobbin 7 and an inner diameter somewhat larger than the outer diameter of the movable yoke 12 and a disk-shaped flange portion 11b formed at one end (left side end portion of the figure) of the insertion portion 11a and having an outer diameter almost equal to the outer diameter of the electromagnetic coil 9. In the fixed guide 11, the insertion portion 11a thereof is inserted between the bobbin 7 and the movable yoke 12 on the opposite side from the fixed yoke 10. Further, the flange portion 11b of the fixed guide 11 is disposed by abutting against one side of the bobbin 7. The fixed guide 11 is fixed and cannot be moved relative to the electromagnetic coil 9, bobbin 7, and fixed yoke 10.

The electromagnetic coil 9, bobbin 7, fixed yoke 10, and fixed guide 11 are connected integrally by a cylindrical case 15 made from a non-magnetic material.

A member (not shown in the figure) made from a nonmagnetic material may be inserted between the convex portion 13 of the fixed yoke 10 and the insertion portion 11a of the fixed guide 11.

On the other hand, a spool valve 2 comprises a sleeve 16 having formed therein a port 6 for passing a fluid, a spool 3 disposed so that it can slide in the axial direction inside the sleeve 16, and bias means (a coil spring in the example shown in the figure) 17 for biasing the spool 3 toward the proportional solenoid 50.

A land 3a for closing the port 6 is formed in the central portion in the longitudinal direction of the spool 3, and the opening surface area of the port 6 can be adjusted by moving the spool 3 relative to the sleeve 16.

A rod portion 3b extending via a through hole 19 formed in the fixed yoke 10 of the proportional solenoid 50 is provided at one end (left end portion in the figure) of the spool 3, and this rod portion 3b is connected to the tip surface of the movable yoke 12.

In the flow control valve 100, where an electric current is applied to the electromagnetic coil 9 of the proportional solenoid 50, a magnetic circuit is formed via the fixed yoke 10, fixed guide 11, and movable yoke 12, and a magnetic attraction force proportional to the applied current is generated between the fixed yoke 10 and movable yoke 12. This attraction force acts as a thrust force Ft that biases the movable yoke 12 toward the fixed yoke 10. Where the movable yoke 12 and the spool 3 connected thereto are moved to the right by the thrust force Ft, as shown in the figure, the coil spring 17 is compressed, and a reaction force Fr is generated that biases the movable yoke 12 in the direction opposite to that of the thrust force Ft.

As a result, the movable yoke 12 and spool 3 are stopped in a position where the thrust force Ft produced by the proportional solenoid 50 is balanced by the reaction force Fr produced by the coil spring 17.

Because the thrust force Ft produced by the proportional solenoid 50 is proportional to electric current applied to the electromagnetic coil 9, the position of the movable yoke 12 and spool 3 can be adjusted by controlling the current applied to the electromagnetic coil 9. Therefore, by controlling the current applied to the electromagnetic coil 9, it is possible to adjust the position of the land 3a of the spool 3 and adjust arbitrarily the opening area of the port 6.

In such proportional solenoid 50 and flow control valve 100 using thereof, a stroke (range of reciprocating movement) of the movable yoke 12 and spool 3 is typically set to range in which the thrust force Ft is constant regardless of the position of the movable yoke 12 and spool 3.

This will be explained with reference to FIG. 7.

FIG. 7 is a graph illustrating the relationship between the thrust force Ft acting upon the movable yoke 12 and the stroke of the movable yoke 12 (a position of the movable yoke 12 where a position closest to the fixed yoke 10 is taken for zero; it can be also called a spacing between the fixed yoke 10 and the movable yoke 12) when a predetermined voltage is applied to the electromagnetic coil 9 of the proportional solenoid 50.

As follows from the figure, where the stroke of the movable yoke 12 (spacing between the fixed yoke 10 and the movable yoke 12) is small in the case the current applied to the electromagnetic coil 9 is constant, the thrust force Ft acting upon the movable yoke 12 rapidly increases from a certain point. Further, where the stroke of the movable yoke 12 increases, the thrust force Ft acting upon the movable yoke 12 rapidly decreases from a certain point.

On the other hand, in the intermediate stroke region shown by an arrow in the figure, the thrust force Ft acting upon the movable yoke 12 is almost constant, regardless of the position (stroke) of the movable yoke 12. This region is called "control range", and usually the stroke (range of reciprocating movement) of the movable yoke 12 is set within this range.

Next, the relationship between the thrust force Ft created by the proportional solenoid 50 and the reaction force Fr created by the coil spring 17 in the flow control valve 100 shown in FIG. 6 will be explained below as a reference example based on FIG. 8.

Lines Ft1 to Ft7 in the figure indicate the thrust force Ft created by the proportional solenoid 50, and it is clear that the thrust force increases as the current applied to the electromagnetic coil 9 increases (as the line number increases).

Line Fr in the figure indicates the reaction force Fr created by the coil spring 17, and it is clear that the reaction force increases as the stroke of the movable yoke 12 decreases (as the movable yoke 12 approaches the fixed yoke 10).

In the figure, points where the thrust force lines Ft1 to Ft7 and reaction line Fr intersect (circles in the figure) are balance points of the two, and the movable yoke 12 stops in these positions.

DISCLOSURE OF THE INVENTION

However, with such proportional solenoid 50 and flow control valve 100 using thereof, friction force between the movable yoke 12 and the fixed yoke 10, the movable yoke 12 and fixed guide 11 as well as the spool 3 and the sleeve 16 create a hysteresis in the actuation of the movable yoke 12 and spool 3. In other words, when the reciprocating movement of the movable yoke 12 and spool 3 is caused by controlling electric current applied to the electromagnetic coil 9 of the proportional solenoid 50, a reciprocating difference in thrust force occurs at a certain current value. Where such hysteresis becomes too large, it leads to ineffective actuation of spool valve 2. Therefore, the hysteresis has to be eliminated or reduced, but this requires an increase in the thrust force Ft of the proportional solenoid 50.

Further, the thrust force Ft of the proportional solenoid 50 may also be required to be increased in order to improve responsiveness of the spool valve 2.

In order to increase the thrust force Ft of the proportional solenoid 50, the proportional solenoid 50 can be increased in size or an electric current applied to the electromagnetic coil 9 can be increased, but in these cases the size and cost of the device are increased.

Accordingly, it is an object of the present invention to resolve the above-described problems and to provide a proportional solenoid that enables the increase in thrust force without increasing the proportional solenoid in size, and a flow control valve using such proportional solenoid.

The first aspect of the present invention created to attain the above-described object provides a proportional solenoid comprising: an electromagnetic coil; a fixed yoke provided immovably inside the electromagnetic coil and having a convex portion formed at an edge portion of an end surface of the fixed yoke; and a movable yoke that is disposed inside the electromagnetic coil, has a tip portion thereof inserted into the convex portion of the fixed yoke, and is provided movably relative to the fixed yoke, the proportional solenoid enabling the position adjustment of the movable yoke by controlling an electric current applied to the electromagnetic coil, wherein a protruding portion that protrudes at the side of the fixed yoke is formed at an edge portion of the surface of the movable yoke on the side of the fixed yoke, and an inner surface of the protruding portion is tapered such that the inner surface is located further outside as the inner surface approaches the fixed yoke.

In the second aspect of the present invention, an outer surface of the protruding portion is formed to extend substantially parallel to an axial line of the movable yoke.

In the third aspect of the present invention, an angle formed by the axial line of the movable yoke and the inner surface of the protruding portion is within a range of 35 to 60 degrees.

In the fourth aspect of the present invention, an end surface extending in a direction substantially perpendicular to the axial line of the movable yoke is formed at the tip of the protruding portion.

In fifth aspect of the present invention, the movable yoke is a cylindrical body having a predetermined outer diameter, and the radial length of the end surface is formed to be equal to or less than 5% of the outer diameter of the movable yoke.

The sixth aspect of the present invention provides a flow control valve comprising: a sleeve having openly formed therein a port for passing a fluid; a spool that is disposed slidably inside the sleeve and serves to open and close the port; valve drive means for causing the spool to move in one direction; and biasing means for biasing the spool in the opposite direction in which the spool is moved by the valve drive means, wherein the valve drive means is the proportional solenoid according to any of aspects 1 to 5 above, the spool is connected to the movable yoke of the proportional solenoid, and a position of the spool connected to the movable yoke can be adjusted by controlling an electric current applied to the electromagnetic coil of the proportional solenoid.

In the seventh aspect of the present invention, the movable yoke and the spool move reciprocatingly with a predetermined stroke, and a length of the protruding portion of the movable yoke is about ½ of the stroke.

The present invention demonstrates an excellent effect of enabling the increase in thrust force, without increasing the proportional solenoid in size.

DETAILED DESCRIPTION OF THE PREFERRED EMBODIMENTS

A preferred embodiment of the present invention will be described below with reference to the appended drawings.

Figure 1:
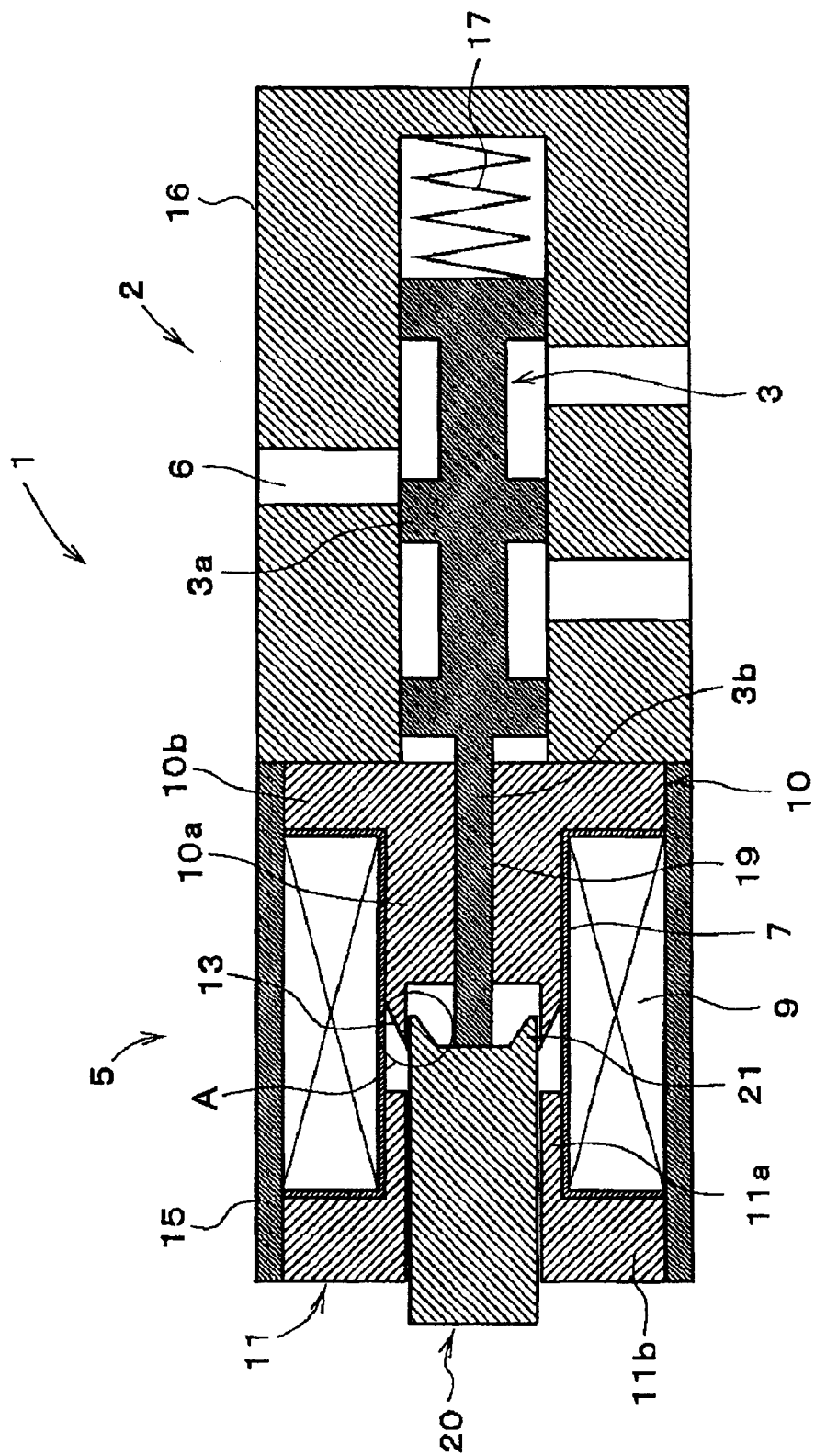
FIG. 1 is a cross-sectional view of a flow control valve using the proportional solenoid of an embodiment of the present invention.
Figure 2:
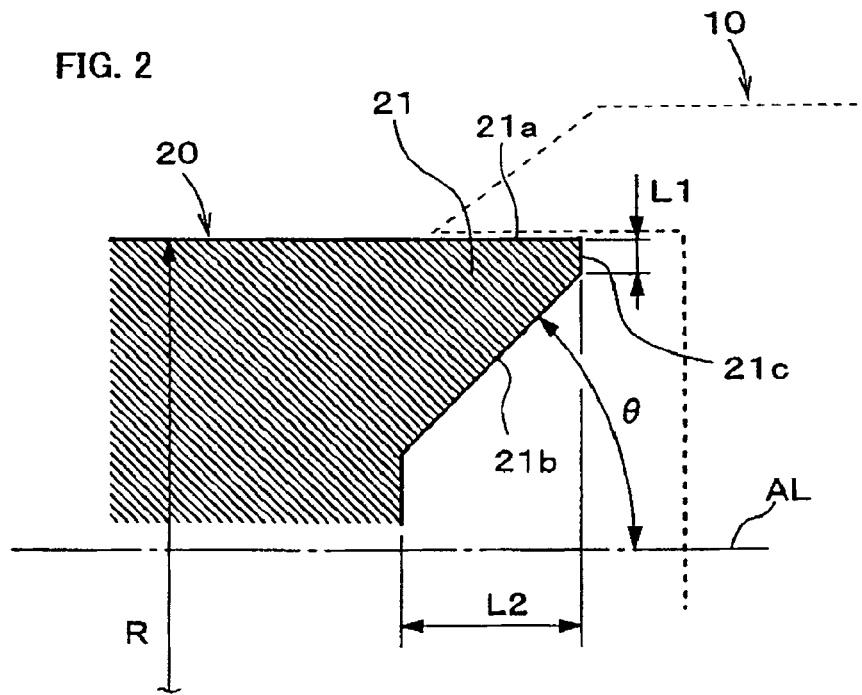
FIG. 2 is an enlarged view of A portion of FIG. 1.

The present embodiment is applied to a flow control valve using a proportional solenoid as a valve drive means. FIG. 1 is a cross-sectional view of the flow control valve. FIG. 2 is an enlarged drawing of a portion representing a specific feature of the flow control valve of the present embodiment.

Figure 6:
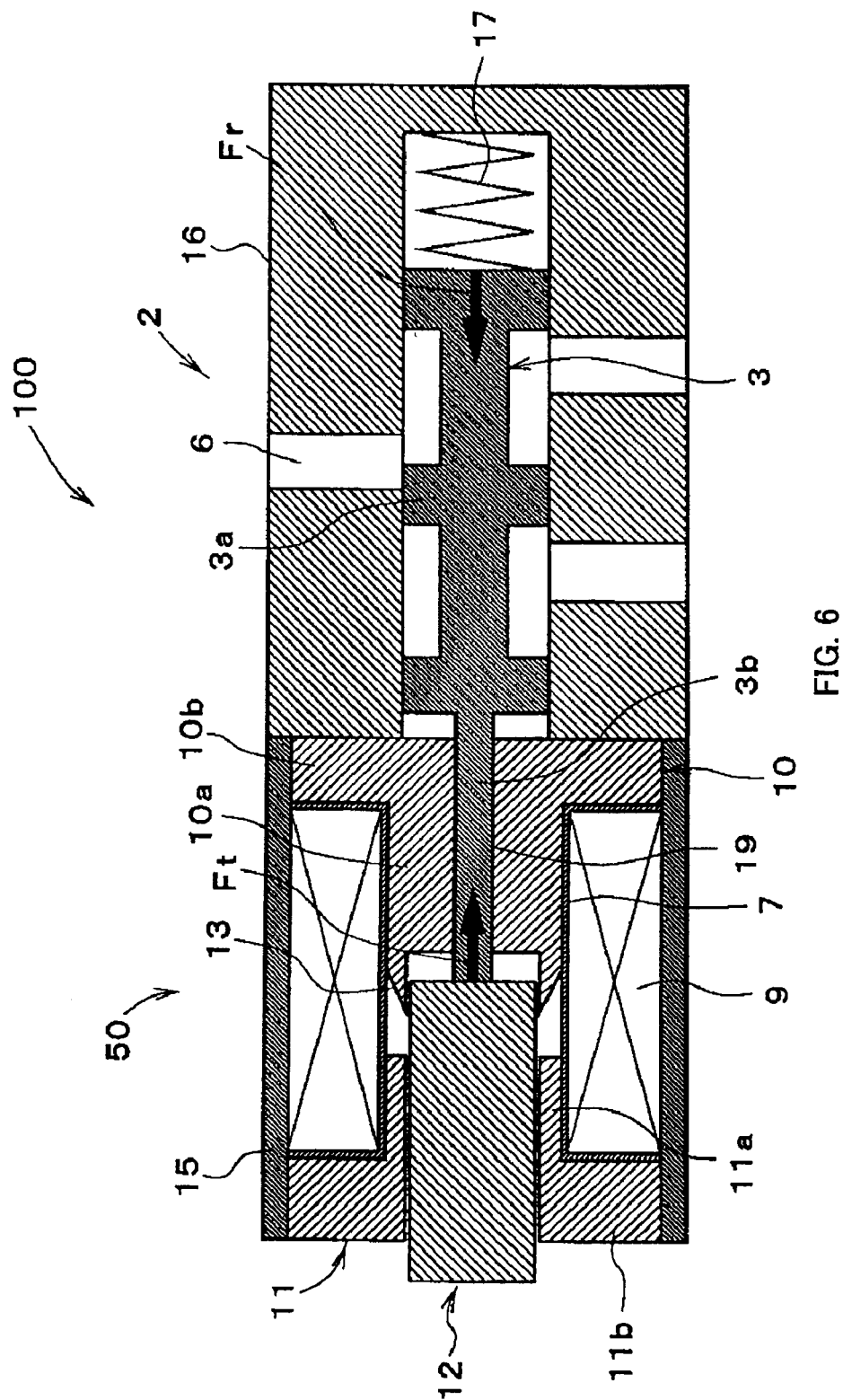
FIG. 6 is a cross-sectional view of the conventional flow control valve.

The basic structure of a flow control valve 1 is identical to that shown in FIG. 6, structural elements identical to those of FIG. 6 are denoted by identical reference symbols, explanation thereof is omitted, and only the difference between the two structures is described.

As follows from FIG. 1 and FIG. 2, a specific feature of the flow control valve 1 of the present embodiment is in a movable yoke 20 of the proportional solenoid 5.

Explaining in greater detail, the movable yoke 20 of the proportional solenoid 5 of the present embodiment has a protruding portion 21 protruding to the side of the fixed yoke 10 at the tip surface of the movable yoke, that is, at the edge portion of the surface facing the fixed yoke 10.

The protruding portion 21 is formed to have annular shape over the entire circumference of the movable yoke 20 and, as shown in FIG. 2, the outer circumferential surface 21a of the protruding portion extends substantially parallel to the axial line AL of the movable yoke 20.

On the other hand, the inner circumferential surface 21b of the protruding portion 21 is tapered as to be inclined at a predetermined angle θ to the axial line AL of the movable yoke 20, such as to be located farther outside in the radial direction as the tip side, that is the fixed yoke 10, is approached.

Further, an end surface 21c extending in the direction substantially perpendicular to the axial line AL of the movable yoke 20 is formed at the tip of the protruding portion 21.

Thus, a specific feature of the flow control valve 1 of the present embodiment is that an annular protruding portion 21 with a tapered inner surface is formed at the tip of the movable yoke 20 of the proportional solenoid 5. Because of this specific feature, the thrust force acting upon the movable yoke 20 when an electric current is applied to the electromagnetic coil 9 can be increased with respect to that of the conventional flow control valve 100 (proportional solenoid 50) shown in FIG. 6. This issue will be explained below.

First, a magnetic flux flowing between the movable yoke 12 and the fixed yoke 10 when an electric current is applied to the electromagnetic coil 9 of the proportional solenoid 50 of the conventional flow control valve 100 (FIG. 6) will be described with reference to FIG. 3.

Figure 3:
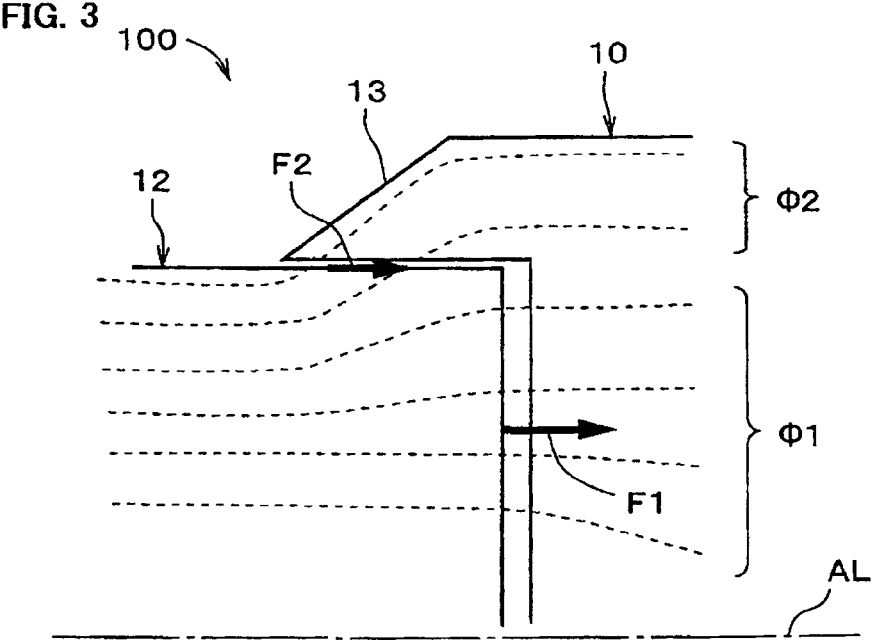
FIG. 3 illustrates schematically a magnetic flux flowing between the movable yoke and the fixed yoke when an electric current is applied to the electromagnetic coil of the conventional flow control valve.

FIG. 3 shows a state in which the stroke of the movable yoke 12 is minimal, that is, the distance between the movable yoke 12 and the fixed yoke 10 is minimal. A dot line in the figure shows schematically the magnetic flux flowing between the movable yoke 12 and the fixed yoke 10.

As follows from the figure, in the conventional flow control valve 100 in which the tip surface of the movable yoke 12 extends substantially perpendicularly to the axial line AL of the movable yoke 12 (extends substantially parallel to the tip surface of the fixed yoke 10), an axial magnetic flux $\phi 1$ flowing in the axial direction from the tip of the movable yoke 12 to the tip of the fixed yoke 10 is larger than a radial magnetic flux $\phi 2$ flowing in the radial direction from the outer circumferential surface of the movable yoke 12 to the inner circumferential surface of a convex portion 13 of the fixed yoke 10 ($\phi 1 > \phi 2$). Therefore, a thrust force (attraction force) F1 acting upon the movable yoke 12 under the effect of the axial magnetic flux $\phi 1$ is larger than a thrust force F2 acting upon the movable yoke 12 under the effect of the radial magnetic flux $\phi 2$. In other words, the thrust force acting upon the movable yoke 12 is generated mainly based on the axial magnetic flux $\phi 1$.

Figure 7:
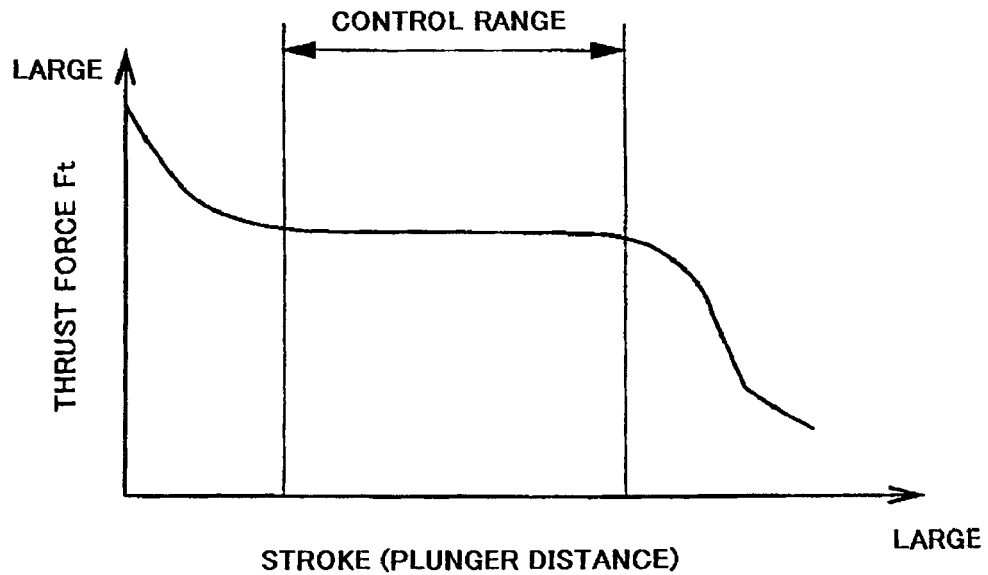
FIG. 7 is a graph illustrating the relationship between a stroke of the movable yoke and a thrust force acting upon the movable yoke when a predetermined current is applied to the electromagnetic coil of the conventional flow control valve.
Figure 8:
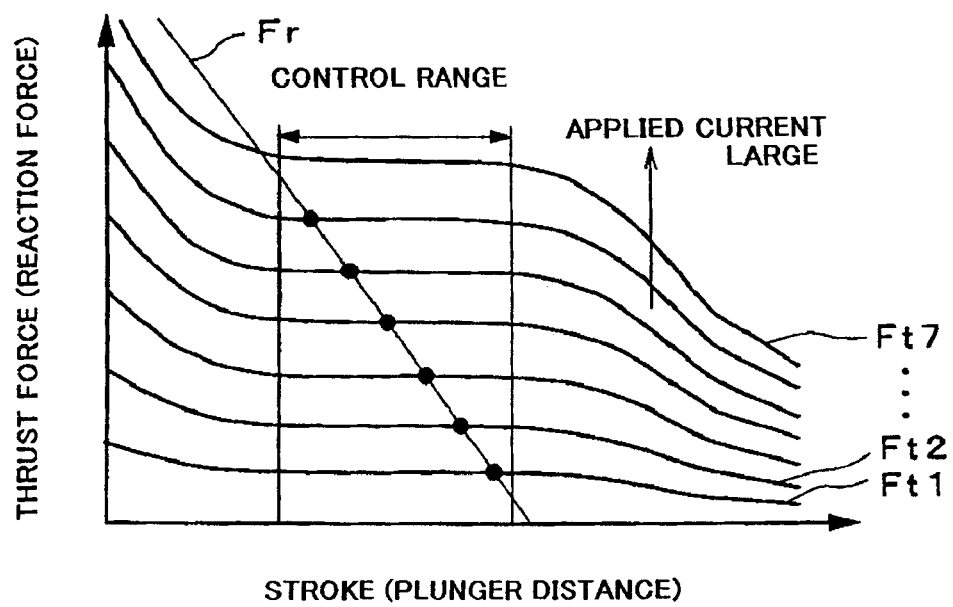
FIG. 8 is a graph illustrating the relationship between a thrust force created by the proportional solenoid and a reaction force created by the coil spring.

Here, because the distance between the tip of the movable yoke 12 and the tip of the fixed yoke 10 changes when the stroke of the movable yoke 12 changes, the thrust force F1 generated by the axial magnetic flux $\phi 1$ is greatly affected by the stroke of the movable yoke 12. For this reason, where the stroke of the movable yoke 12 increases in a region where the stroke of the movable yoke 12 is small, the thrust force acting upon the movable yoke 12 decreases abruptly (see FIG. 7). Therefore, the control range is positioned on a larger stroke side from the region in which the thrust force changes (decreases) abruptly.

Next, a magnetic flux flowing between the movable yoke 20 and the fixed yoke 10 when an electric current is applied to the electromagnetic coil 9 of the proportional solenoid 5 of the flow control valve 1 (FIG. 1 and FIG. 2) of the above-described present embodiment will be explained with reference to FIG. 4.

Figure 4:
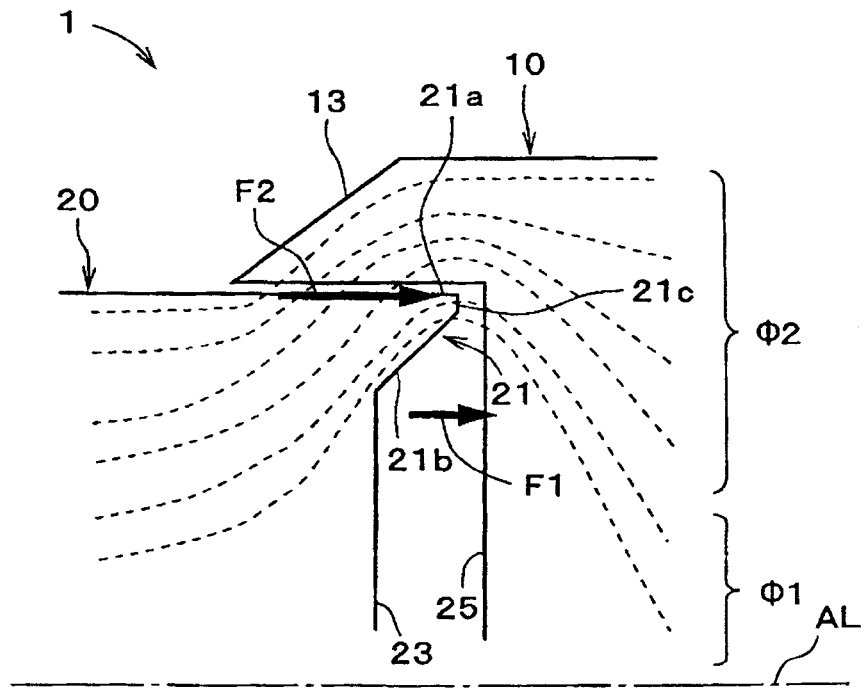
FIG. 4 illustrates schematically a magnetic flux flowing between the movable yoke and the fixed yoke when an electric current is applied to the electromagnetic coil of the flow control valve shown in FIG. 1.

FIG. 4 shows a state in which the stroke of the movable yoke 20 is minimal, that is, the distance between the movable yoke 20 and the fixed yoke 10 is minimal. A dot line in the figure shows schematically the magnetic flux flowing between the movable yoke 20 and the fixed yoke 10.

As follows from the figure, in the flow control valve 1 (proportional solenoid 5) of the present embodiment in which the annular protruding portion 21 with the inclined inner circumferential surface 21b is formed at the tip of the movable yoke 20, an axial magnetic flux $\phi 1$ flowing in the axial direction from the end surface 21c of the protruding portion 21 of the movable yoke 20 to the tip of the fixed yoke 10 is smaller than a radial magnetic flux $\phi 2$ flowing in the radial direction from the outer circumferential surface 21a of the protruding portion 21 of the movable yoke 20 to the inner circumferential surface of the convex portion 13 of the fixed yoke 10 ($\phi 1 < \phi 2$).

This is apparently because the orientation of the magnetic flux flowing in the protruding portion 21 changes toward the outside in the radial direction since the inner circumferential surface 21b of the protruding portion 21 is inclined such as to be located farther outside in the radial direction as the fixed yoke 10 is approached, and also because the distance between a central portion 23 of the tip of the movable yoke 20 and the tip 25 of the fixed yoke 10 is increased with respect to that in the conventional flow control valve.

Therefore, in the flow control valve 1 of the present embodiment, a thrust force F2 acting upon the movable yoke 20 under the effect of the radial magnetic flux $\phi 2$ is larger than a thrust force (attraction force) F1 acting upon the movable yoke 20 under the effect of the axial magnetic flux $\phi 1$. In other words, in the flow control valve 1 of the present embodiment, the thrust force acting upon the movable yoke 20 is generated mainly based on the radial magnetic flux $\phi 2$.

Here, because the distance between the outer circumferential surface 21a of the protruding portion 21 of the movable yoke 20 and the inner circumferential surface of the convex portion 13 of the fixed yoke 10 is constant regardless of the stroke of the movable yoke 20, the thrust force F2 generated by the radial magnetic flux $\phi 2$ is substantially constant (not affected by the stroke of the movable yoke 20) regardless of the stroke of the movable yoke 20. Therefore, in the flow control valve 1 of the present embodiment, even if the stroke of the movable yoke 12 increases in the region with a small stroke of the movable yoke 20, the thrust force does not decrease and is maintained at a-substantially constant value. As a result, the thrust force acting upon the movable yoke 20 in the flow control valve 1 (proportional solenoid 5) of the present embodiment is larger than in the conventional flow control valve 100 (proportional solenoid 50) in which thrust force drops abruptly when the stroke of the movable yoke 12 increases.

This result will be explained with reference to FIG. 5.

Figure 5:
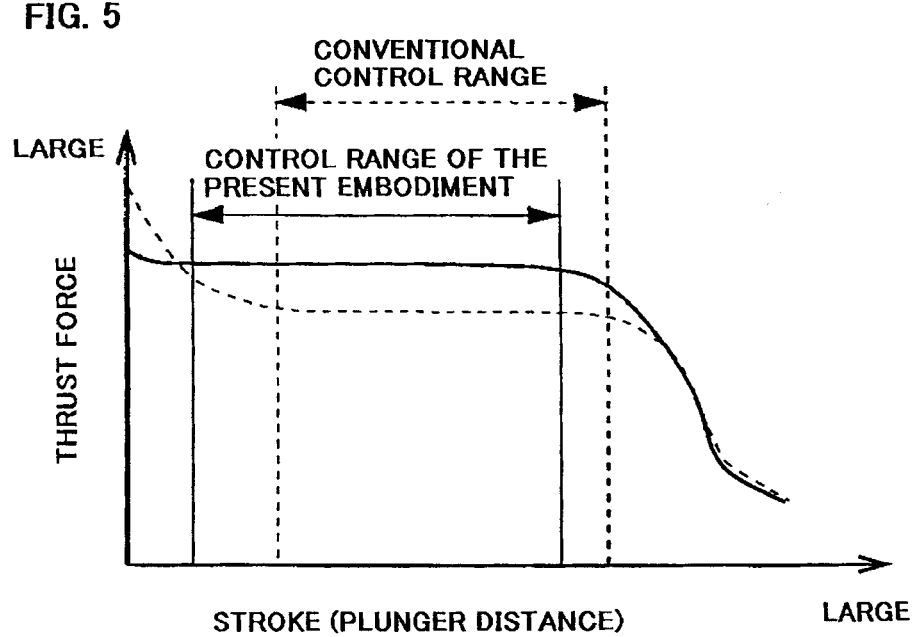
FIG. 5 is a graph illustrating the relationship between a stroke of the movable yoke and a thrust force acting upon the movable yoke when a predetermined current is applied to the electromagnetic coil of the proportional solenoid.

FIG. 5 shows the relationship between the stroke of the movable yoke 20 and the thrust force acting upon the movable yoke 20 when a predetermined electric current is applied to the electromagnetic coil 9 of the proportional solenoid 5 of the flow control valve 1 of the present embodiment. For comparison, the thrust force of the proportional solenoid 50 of the conventional flow control valve 100 shown in FIG. 6 is also shown by a dot line.

As follows from the figure, in the flow control valve 1 of the present embodiment, practically no decrease in thrust force is observed in a region with a small stroke of the movable yoke 20, and the thrust force in the region with a constant thrust force (control range) is increased significantly with respect to that of the conventional flow control valve 100. Further, the control range of the flow control valve 1 of the present embodiment is wider than the control range of the conventional flow control valve 100 and shifts to the region with a small stroke.

Therefore, by using the flow control valve 1 of the present embodiment, it is possible to increase the thrust force acting upon the movable yoke 20, without increasing the proportional solenoid 5 in size, and the hysteresis of the movable yoke 20 and spool 3 can be eliminated or reduced. Further, because the thrust force acting upon the spool 3 also increases, the responsiveness of the flow control valve 1 (spool valve 2) is improved.

Further, in the flow control valve 1 of the present embodiment, the control range is wider than in the conventional flow control valve. Therefore, the strokes of the movable yoke 20 and spool 3 can be set larger than in the conventional flow control valve. As a result, the control range of flow rate can be increased and the maximum flow rate can be raised.

The applicant carried out a variety of tests by changing the shape of the protruding portion 21 with the object of finding an optimum shape of the protruding portion 21 that produces the above-described effect.

The results demonstrated that the shape of the protruding portion 21 is preferably set as described hereinbelow.

First, an angle $\theta$ (taper angle) formed by the axial line AL of the movable yoke 20 and the inner circumferential surface 21b of the protruding portion 21 shown in FIG. 2 is preferably set within a range of 35 to 60 degrees.

The radial length L1 of the tip surface 21c of the protruding portion 21 is preferably set to be equal to or less than 5% of the outer diameter R of the movable yoke 20.

The axial length L2 of the protruding portion 21 is preferably set to about ½ of the stroke (usually, the control range) of the movable yoke 20 and spool 3.

The above-described embodiment is presented as an example of the present embodiment, and the present invention is not limited to this embodiment.

For example, in the present embodiment the flow control valve 1 using the proportional solenoid 5 is explained, but the present invention can be also applied to other means such as a pressure control valve and a direction switching valve, provided that the proportional solenoid is used as the valve drive means.

Further, the structure of the flow control valve 1 is not limited to that shown in the figures.

While the present invention has been illustrated and described with respect to a particular embodiment thereof, it should be appreciated by those of ordinary skill in the art that various modifications to this invention may be made without departing from the spirit and scope of the present invention.

The invention claimed is:

1. A proportional solenoid, comprising: an electromagnetic coil; a fixed yoke provided immovably inside the electromagnetic coil and having a convex portion formed at an edge portion of an end surface of the fixed yoke; and a movable yoke that is disposed inside the electromagnetic coil, has a tip portion thereof inserted into the convex portion of the fixed yoke, and is provided movably relative to the fixed yoke, the proportional solenoid enabling the position adjustment of the movable yoke by controlling an electric current applied to the electromagnetic coil, wherein a protruding portion that protrudes at the side of the fixed yoke is formed at an edge portion of the surface of the movable yoke on the side of the fixed yoke, and an inner surface of the protruding portion is tapered such that the inner surface is located further outside as the inner surface approaches the fixed yoke and an outer surface of the protruding portion is formed to extend substantially parallel to an axial line of the movable yoke, and wherein an end surface extending in a direction substantially perpendicular to the axial line of the movable yoke is formed at the tip of the protruding portion, and a radial length of the end surface is set such that a radial magnetic flux flowing in a radial direction from the outer surface of the protruding portion is larger than an axial magnetic flux flowing in an axial direction from the end surface.

2. The proportional solenoid according to claim 1, wherein an angle formed by the axial line of the movable yoke and the inner surface of the protruding portion is within a range of 35 to 60 degrees.

3. The proportional solenoid according to claim 1, wherein the movable yoke is a cylindrical body having a predetermined outer diameter, and the radial length of the end surface is formed to be equal to or less than 5% of the outer diameter of the movable yoke.

4. A flow control valve comprising: a sleeve having openly formed therein a port for passing a fluid; a spool that is disposed slidably inside the sleeve and serves to open and close the port; valve drive means for causing the spool to move in one direction; and biasing means for biasing the spool in the opposite direction in which the spool is moved by the valve drive means, wherein the valve drive means is the proportional solenoid according to claim 1 above, the spool is connected to the movable yoke of the proportional solenoid; and a position of the spool connected to the movable yoke can be adjusted by controlling an electric current applied to the electromagnetic coil of the proportional solenoid.

5. The flow control valve according to claim 4, wherein the movable yoke and the spool move reciprocatingly with a predetermined stroke; and a length of the protruding portion of the movable yoke is about ½ of the stroke.

* * * * *